(12) United States Patent
Vu

(10) Patent No.: US 10,113,665 B2
(45) Date of Patent: Oct. 30, 2018

(54) LOW HYSTERESIS DIAPHRAGM FOR A VALVE

(71) Applicant: VistadelTek, LLC, Yorba Linda, CA (US)

(72) Inventor: Kim Ngoc Vu, Yorba Linda, CA (US)

(73) Assignee: VistadelTek, LLC, Yorba Linda, CA (US)

( * ) Notice: Subject to any disclaimer, the term of this patent is extended or adjusted under 35 U.S.C. 154(b) by 2 days.

(21) Appl. No.: 15/182,978

(22) Filed: Jun. 15, 2016

(65) Prior Publication Data

US 2016/0369915 A1    Dec. 22, 2016

Related U.S. Application Data

(60) Provisional application No. 62/180,867, filed on Jun. 17, 2015.

(51) Int. Cl.
| | |
|---|---|
| *F16K 7/12* | (2006.01) |
| *F16K 41/10* | (2006.01) |
| *F16K 1/36* | (2006.01) |
| *F16K 41/12* | (2006.01) |
| *F16K 7/14* | (2006.01) |
| *F16K 27/02* | (2006.01) |

(52) U.S. Cl.
CPC ............... *F16K 41/12* (2013.01); *F16K 1/36* (2013.01); *F16K 7/123* (2013.01); *F16K 7/14* (2013.01); *F16K 27/0236* (2013.01); *F16K 41/103* (2013.01)

(58) Field of Classification Search
CPC . F16K 41/12; F16K 7/123; F16K 1/36; F16K 41/103

USPC ...................................................... 251/335.2
See application file for complete search history.

(56) References Cited

U.S. PATENT DOCUMENTS

| | | | |
|---|---|---|---|
| 4,606,374 | A | 8/1986 | Kolenc et al. |
| 4,732,363 | A | 3/1988 | Kolenc et al. |
| 5,145,147 | A | 9/1992 | Nakazawa et al. |
| 5,201,492 | A | 4/1993 | Beauvir |
| 5,755,428 | A | 5/1998 | Ollivier |
| 5,820,105 | A | 10/1998 | Yamaji et al. |
| 5,851,004 | A | 12/1998 | Wu et al. |
| 5,927,325 | A | 7/1999 | Bensaoula et al. |
| 6,123,320 | A | 9/2000 | Rasanow et al. |
| 2005/0224744 | A1 | 10/2005 | Newberg |
| 2006/0174945 | A1 | 8/2006 | Maula et al. |

(Continued)

FOREIGN PATENT DOCUMENTS

EP    0727604 A1    8/1996

OTHER PUBLICATIONS

International Search Report and Written Opinion from corresponding International Application No. PCT/US2016/037522 dated Oct. 7, 2016.

*Primary Examiner* — Marina Tietjen
(74) *Attorney, Agent, or Firm* — Lando & Anastasi, LLP

(57) ABSTRACT

A valve diaphragm processed by cold working a small concentric region of one surface has a permanent axisymmetric deformation. The deformed diaphragm can be used in a manner which causes continual elastic compression loading of the diaphragm material. The loading of the deformed diaphragm provides a valve restoring spring force and simultaneously defeats diaphragm tendency toward exhibiting hysteresis. The restoring force provided by the diaphragm can also lessen actuator hysteresis.

15 Claims, 5 Drawing Sheets

(56) References Cited

U.S. PATENT DOCUMENTS

2007/0200082 A1* 8/2007 Crockett ............... C22C 19/055
251/349
2010/0096578 A1 4/2010 Franz et al.

\* cited by examiner

Section A-A

Section B-B

LOW HYSTERESIS DIAPHRAGM FOR A VALVE

CROSS-REFERENCE TO RELATED APPLICATIONS

This application claims the benefit under 35 U.S.C. § 119(e) to U.S. Provisional Application Ser. No. 62/180,867 titled "LOW HYSTERESIS DIAPHRAGM FOR A VALVE," filed Jun. 17, 2015, which is incorporated by reference herein in its entirety for all purposes.

BACKGROUND

Embodiments of the present invention are related to valves designed for control of fluid delivery within industrial processes making semiconductor devices, pharmaceuticals, fine chemicals, and many similar fluid delivery systems. Controlled fluids may be liquids, gases, vacuum, vapors, or combinations of substances in those states. Fluid delivery apparatus intended for manipulating process materials within semiconductor manufacturing equipment usually require attention to maintaining high purity of the delivered reactants. Mechanical shafts sliding or rotating within a packing type of seal arrangement are known to often cause detectable particulate contamination of high purity process materials. Fluids that are radioactive, poisonous, pyrophoric, or otherwise dangerous, may also be thought less safe when handled in apparatus having packing type seals. U.S. Pat. Nos. 4,606,374 and 4,732,363 both issued to Terrence J. Kolenc, et al., are two examples of valves using metallic diaphragms (instead of packing type seals) for sealing the controlled fluid from the surrounding environment. A variety of actuator types, including manual, pneumatic and electric, may be used with diaphragm sealed valves as is well known. It is also known that actuators intended for simple on-off control of fluids as well as actuators designed for proportional, or modulating, control of fluid delivery within industrial processes making semiconductor devices may be used with appropriately designed diaphragm sealed valves.

Designers of valves for high purity applications generally are aware of many different approaches to providing a leak tight valve chamber sealing diaphragm. In U.S. Pat. No. 4,606,374 issued to Kolenc et al., a diaphragm comprised of three sheet metal discs is peripherally clamped between stepped structures in a valve body and a valve bonnet. In U.S. Pat. No. 5,145,147 issued to Nakazawa et al., a single layer sheet metal diaphragm is welded to a portion of a valve assembly. In U.S. Pat. No. 5,755,428 issued to Ollivier, a diaphragm is statically sealed against a valve body by a clamping member forcing the diaphragm against a toroidal-shaped projection on the valve body.

Various other developments in the field of diaphragms have dealt with material composition as described in U.S. Pat. No. 5,820,105 issued to Yamaji et al., diaphragm shape or contacting actuator as described in U.S. Pat. No. 5,851,004 issued to Wu et al., and U.S. Pat. No. 5,201,492 issued to Beauvir for example. Some designers have found considerable performance limitations associated with hysteresis of actuators and diaphragms themselves. U.S. Pat. No. 5,927,325 issued to Bensaoula et al. provides an example case discussing hysteresis in detail.

SUMMARY

Embodiments of the present invention are directed to a sealing diaphragm machined as an integral element of a valve housing. For convenience all figures in this disclosure show a similar integrally machined valve sealing diaphragm, but it should be appreciated other combinations of diaphragm and valve housing, or valve body, elements can be used with the present invention and the integral diaphragm should not be construed as limiting.

In accordance with aspects of the present invention, applicant has implemented a manufacturing process which improves the performance of metallic diaphragms intended for use in proportional valves. The improvement creates a cold worked region, which is ring shaped for a circular diaphragm, that causes an otherwise flat diaphragm to consequently deform into an approximately conical form. Axial loading of the deformed diaphragm, in a direction collapsing the conical form, induces a stressed diaphragm arcuate cross-sectional shape imparting compressive forces to the diaphragm material in all operating circumstances. The formerly flat diaphragm is always loaded and therefore provides desirable returning spring force while consequently precluding hysteresis, which can be very problematic in proportional control valves.

In one aspect of the present disclosure, a valve diaphragm includes a first surface and a second surface opposing the first surface, and the first surface has a plastically deformed concentric strain hardened region having a concave shape.

In some embodiments, a thickness of the valve diaphragm is reduced between 5% and 20% in the strain hardened region of the valve diaphragm.

In some embodiments, the strain hardened region has a radial width that is between 50% and 200% of a thickness of an adjacent region of the valve diaphragm.

In some embodiments, the strain hardened region includes a concentric region of the valve diaphragm that is plastically deformed by a thickness reduction of about 10% of a thickness of an adjacent region of the valve diaphragm across a radial width of about 100% of the thickness of the adjacent region of the valve diaphragm.

In some embodiments, the strain hardened region is between $\frac{1}{3}$ and $\frac{2}{3}$ of a distance between an inner periphery of the valve diaphragm and an outer periphery of the valve diaphragm.

In some embodiments, the valve diaphragm includes a corrosion resistant metallic alloy.

In some embodiments, the valve diaphragm includes a control element attached to the valve diaphragm at an inner periphery of the valve diaphragm, with the control element having a control shaft extending away from the first surface of the valve diaphragm, and the control element having a control surface offset from the second surface of the valve diaphragm. The control surface is configured to selectively engage a valve seat.

In some embodiments, the valve diaphragm includes a valve housing. The valve diaphragm is in sealing engagement with the valve housing at the outer periphery of the valve diaphragm.

In some embodiments, the valve diaphragm includes a control element attached to the valve diaphragm at an inner periphery of the valve diaphragm, with the control element having a control shaft extending away from the second surface of the valve diaphragm, and the control element having a control surface offset from the first surface of the valve diaphragm. The control surface is configured to selectively engage a valve seat.

In another aspect of the present invention, a valve housing for a control valve includes a valve housing body and a valve diaphragm in sealing engagement with the valve housing body at an outer periphery of the valve diaphragm. The valve diaphragm has a first surface and a second surface opposing the first surface. The first surface has a plastically deformed concentric strain hardened region having a concave shape.

In some embodiments, a thickness of the valve diaphragm is reduced between 5% and 20% in the strain hardened region of the valve diaphragm.

In some embodiments, the strain hardened region has a radial width that is between 50% and 200% of a thickness of an adjacent region of the valve diaphragm.

In some embodiments, the strain hardened region includes a concentric region of the valve diaphragm that is plastically deformed by a thickness reduction of about 10% of a thickness of an adjacent region of the valve diaphragm across a radial width of about 100% of the thickness of the adjacent region of the valve diaphragm.

In some embodiments, the strain hardened region is between 1/3 and 2/3 of a distance between an inner periphery of the valve diaphragm and the outer periphery of the valve diaphragm.

In some embodiments, the valve diaphragm includes a corrosion resistant metallic alloy.

In some embodiments, the valve housing includes a control element attached to the valve diaphragm at an inner periphery of the valve diaphragm, with the control element having a control shaft extending away from the first surface of the valve diaphragm and a control surface offset from the second surface of the valve diaphragm. The control surface is configured to selectively engage a valve seat.

In some embodiments, the valve housing includes a control element attached to the valve diaphragm at the inner periphery of the valve diaphragm, with the control element having a control shaft extending away from the second surface of the valve diaphragm and a control surface offset from the first surface of the valve diaphragm. The control surface is configured to selectively engage a valve seat.

In another aspect of the present invention, a control valve includes a valve body having a fluid inlet conduit terminating at a fluid inlet orifice and a fluid outlet conduit commencing at a fluid outlet orifice. A seat is defined at either the fluid inlet orifice or the fluid outlet orifice. A valve housing body is secured to the valve body. A valve diaphragm is in sealing engagement with the valve housing body at an outer periphery of the valve diaphragm, and the valve diaphragm has a first surface and a second surface opposing the first surface. Either the first surface or the second surface has a plastically deformed concentric strain hardened region having a concave shape. A control element is attached to the valve diaphragm. The control element has a control surface offset from the first surface of the valve diaphragm. The control surface is configured to selectively engage the seat, and the valve body, the valve housing body, and the valve diaphragm cooperate to define a valve chamber.

In some embodiments, a thickness of the valve diaphragm is reduced between 5% and 20% in the strain hardened region of the valve diaphragm.

In some embodiments, the strain hardened region has a radial width that is between 50% and 200% of a thickness of an adjacent region of the valve diaphragm.

In some embodiments, the strain hardened region includes a concentric region of the valve diaphragm that is plastically deformed by a thickness reduction of about 10% of a thickness of an adjacent region of the valve diaphragm across a radial width of about 100% of the thickness of the adjacent region of the valve diaphragm.

In some embodiments, the strain hardened region is between 1/3 and 2/3 of a distance between an inner periphery of the valve diaphragm and the outer periphery of the valve diaphragm.

In some embodiments, the valve diaphragm comprises a corrosion resistant metallic alloy.

In some embodiments, a control shaft extends away from the second surface of the valve diaphragm.

In some embodiments, the control valve is a normally open control valve, and the plastically deformed concentric strain hardened region having the concave shape is formed in the first surface of the valve diaphragm.

In some embodiments, the control valve is a normally closed control valve, and the plastically deformed concentric strain hardened region having the concave shape is formed in the second surface of the valve diaphragm.

In one embodiment a valve diaphragm is processed by cold working a small concentric region of one diaphragm surface. In another embodiment the cold working process creates a permanent plastic deformation reducing a diaphragm thickness between 5% and 20%. In another embodiment a radial width of a cold worked region is between 50% and 200% of a diaphragm thickness. In another embodiment a valve diaphragm for use in a normally closed valve has a concentric region of the diaphragm exterior to a valve chamber plastically deformed by a thickness reduction of about 10% of a diaphragm thickness across a radial width of about 100% of the diaphragm thickness. In another embodiment a valve diaphragm for use in a normally open valve has a concentric region of the diaphragm exposed to a valve chamber plastically deformed by a thickness reduction of about 10% of a diaphragm thickness across a radial width of about 100% of the diaphragm thickness. In various embodiments, the diaphragm is formed from a corrosion resistant metallic alloy, such as type 316 stainless steel, Hastelloy® brand nickel-chromium alloys available from Haynes International, Elgiloy® brand cobalt-chromium alloys available from Elgiloy Specialty Metals, etc.

DETAILED DESCRIPTION

Figure 1:
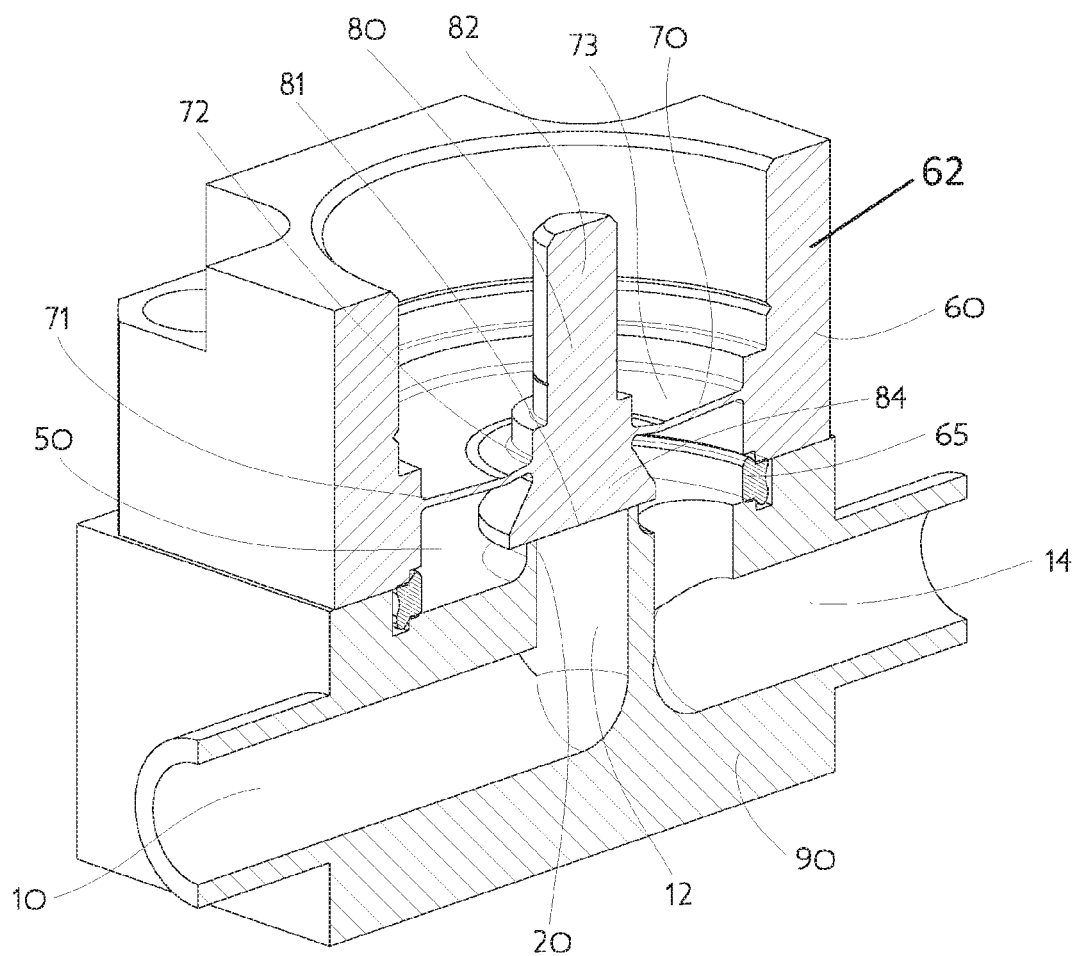
FIG. 1 is a perspective cross-section of a representative normally closed diaphragm sealed valve.

This invention is not limited in its application to the details of construction and the arrangement of components set forth in the following description or illustrated in the drawings. The invention is capable of other embodiments and of being practiced or of being carried out in various ways. Also, the phrasing and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The use of directional adjectives "inner, "outer," "upper," "lower," and like terms, are meant to assist with understanding relative relationships among design elements and should not be construed as meaning an absolute direction in space nor regarded as limiting.

A representative example of a diaphragm sealed valve for use in a high purity fluid delivery application is illustrated in perspective cross-section by FIG. 1. This valve comprises a valve body 90, an inlet conduit 10 and an outlet conduit 14 both of which communicate fluid to or from a valve chamber 50, a valve housing 60 having a valve housing body 62 and including a chamber sealing diaphragm 70, the valve housing 60 being sealed against the valve body 90 by a metallic gasket 65, and a control element 80 moveable by deflection of the diaphragm 70. In FIG. 1, the control element 80 has a control surface 81 that is downwardly offset from a first surface of the valve diaphragm. The control surface is preferably flat, at least in a region where it sealingly engages the seat 20. The chamber sealing diaphragm is in sealing engagement with the valve housing 60 at the outer diameter 71 of the sealing diaphragm 70. The manner of controlling fluid flow may be further understood by considering an orifice 12, through which the inlet conduit 10 discharges fluid into the valve chamber 50, and a seat 20 surrounding said orifice 12, thereby defining a small clearance control gap with respect to the control element 80 which may be changeably positioned by a lifting force applied to a control shaft 82 of the control element 80, and through which control gap fluid may flow. The control shaft 82 in FIG. 1 extends upwardly from an upper surface (or second surface) 73 of the diaphragm 70. It should be appreciated the illustration of FIG. 1 shows a normally closed valve in an un-actuated fully closed not flowing fluid condition and therefore no control gap, as such, is to be revealed in the illustrated configuration.

As used herein, the term 'cold working,' also known as 'work hardening' or 'strain hardening,' refers to the strengthening of a material, typically a metal or metallic alloy, by plastic deformation. The terms 'cold working,' 'work hardening,' and 'strain hardening' are used interchangeably herein.

Applicant has discovered that cold working a small concentric region of one diaphragm surface will cause a permanent deformation of the diaphragm. The deformed diaphragm can then be used in a manner which causes continual elastic compression loading of the diaphragm material. The loading of the deformed diaphragm provides needed valve restoring spring force and simultaneously defeats any diaphragm tendency toward exhibiting hysteresis. The restoring force provided by the diaphragm can also lessen actuator hysteresis. The plastic deformation cold work process can be performed on diaphragms that are sheet metal blanks or diaphragms that are machined as an integral portion of a larger valve element. It should be appreciated that the diaphragm does not need to be integrally formed with the valve housing 60 in the valve housing body 62, as embodiments of the present disclosure encompass diaphragms that are stamped, punched, or cut out of a piece of sheet metal that is later attached to a valve housing body 62 to form a valve housing. The diaphragm 70 is in sealing engagement with an inner diameter the valve housing 60 to prevent fluid from leaking upwardly from the valve chamber 50.

Cold working a concentric region of a metallic diaphragm produces localized work hardening of the alloy and a related increase in yield strength. Strength of materials studies teach compressive stresses are imparted within the worked region on the one side while material on the other side of the diaphragm undergoes tensile stresses. Cold working sufficient to cause permanent plastic deformation of the diaphragm surface will consequently cause compressive forces to become stored within the worked surface and expansive tensile forces to become stored within the opposite surface. The combination of these forces causes the cold worked diaphragm to axisymmetrically bow with the cold worked region being inside the concave side of the resulting cup shape. The cup shape resulting from cold working a region of the diaphragm may be chosen to enhance the performance of a normally closed valve or a normally open valve by selecting which side of the diaphragm to process.

Figure 2A:
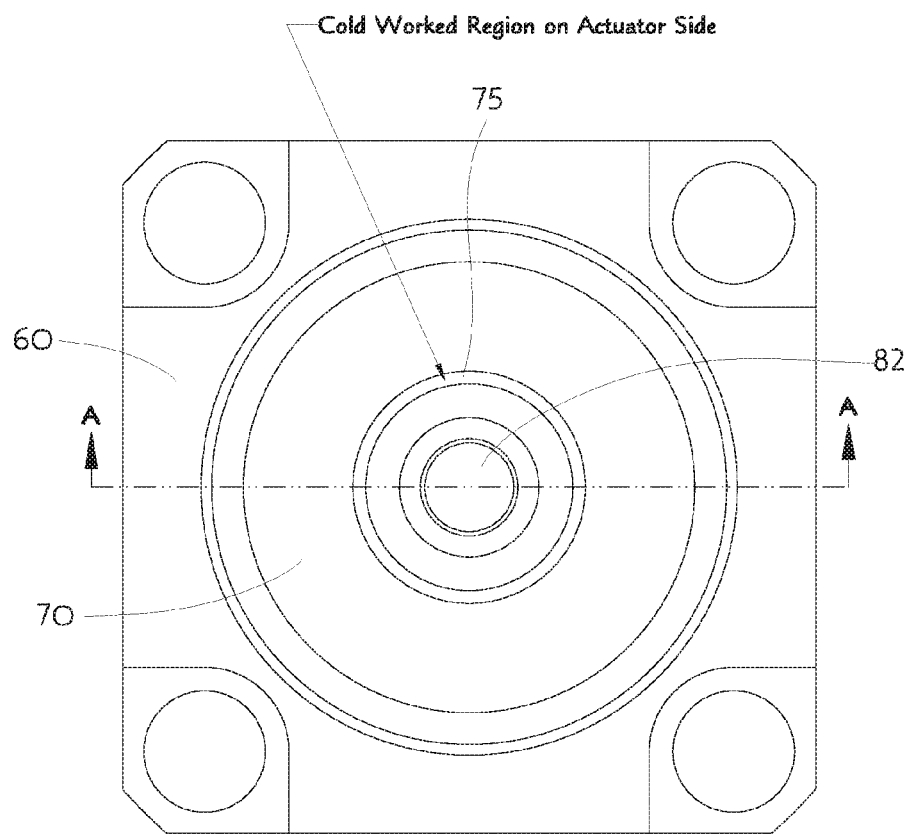
FIG. 2A is a plan view seen from the actuator side of a diaphragm intended for a normally closed valve.
Figure 2B:
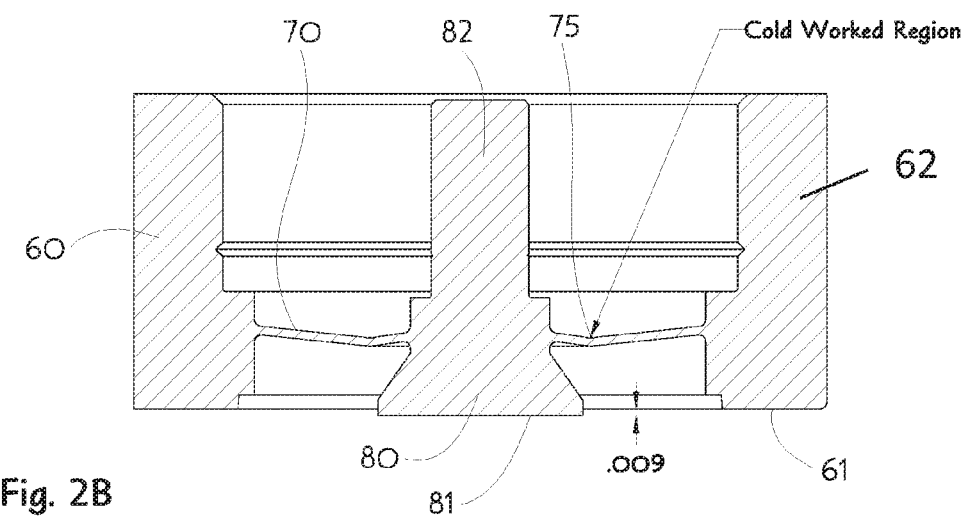
FIG. 2B is a cross-section through the diaphragm of FIG. 2A intended for a normally closed valve.

FIG. 2A and FIG. 2B illustrate how cold working a region 75 on the actuator side of a diaphragm 70 will cause the diaphragm to become concave toward the actuator while simultaneously being biased toward the valve seat 20. This arrangement placing the cold worked region exterior to the valve chamber 50 is useful for a normally closed valve design. FIG. 2A is a plan view of the valve housing 60 seen from the actuator side of the sealing diaphragm 70. FIG. 2B is a cross-section through the valve housing 60, after the cold working process, and shows how the resulting unbiased location of the control surface 81 of the control element 80 extends below the previously coplanar bottom 61 of the valve housing 60. Attaching the valve housing 60 to the valve body 90 will cause the control surface 81 of the control element 80 to rest against the valve seat 20 and thus bow the diaphragm 70. The diaphragm 70 is consequently subject to continual elastic compression loading even when the normally closed valve is shut. Applying a lifting force to the control shaft 82, to open the valve for fluid flow, will further deflect the diaphragm 70 and increase the compression within the diaphragm material.

Figure 3:
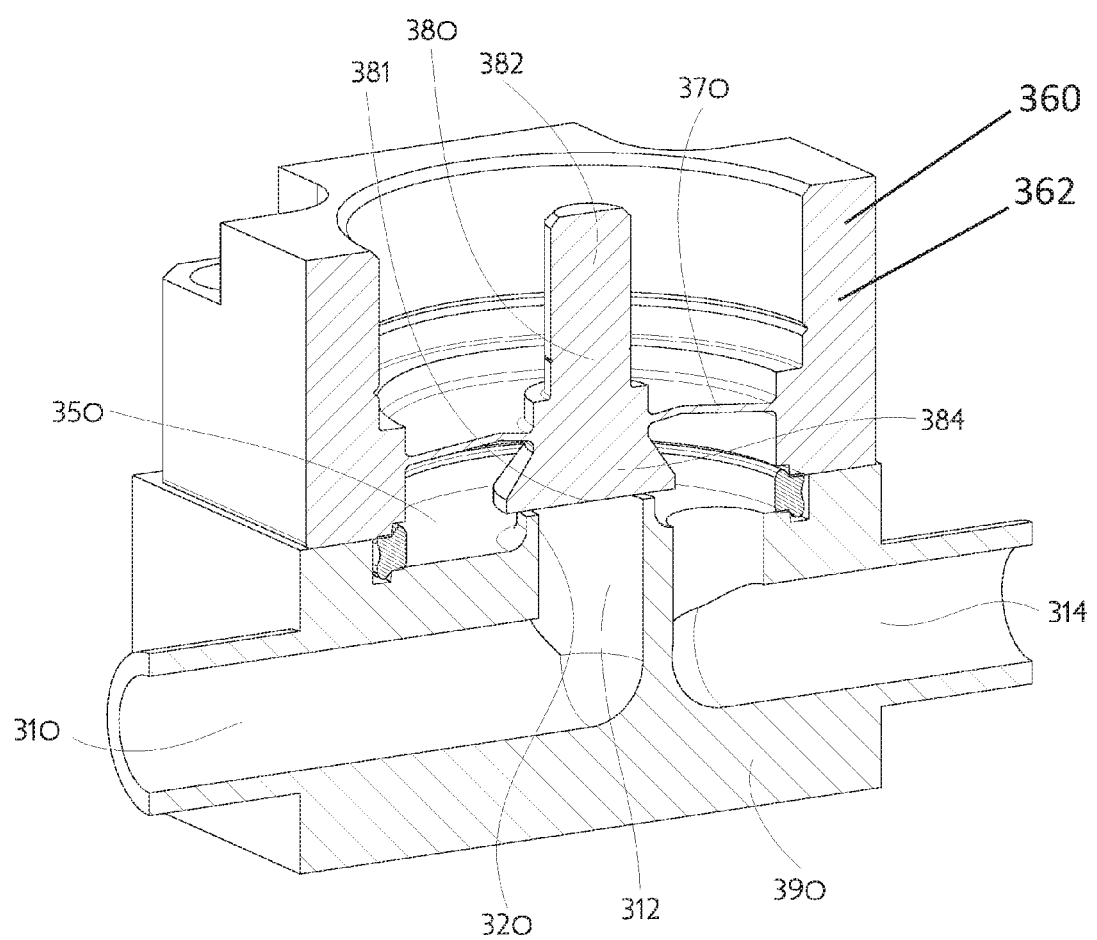
FIG. 3 is a perspective cross-section of a representative normally open diaphragm sealed valve.

Another representative example of a diaphragm sealed valve for use in a high purity fluid delivery application is illustrated in perspective cross-section by FIG. 3. This typical valve comprises a valve body 390, an inlet conduit 310 and an outlet conduit 314 both of which communicate fluid to or from a valve chamber 350, a valve housing 360 having a valve housing body 362 and including a chamber sealing diaphragm 370, the valve housing 360 being sealed against the valve body 390 by a metallic gasket 365, and a control element 380 moveable by deflection of the diaphragm 370. The manner of controlling fluid flow may be further understood by considering an orifice 312, through which the inlet conduit 310 discharges fluid into the valve chamber 350, and a seat 320 surrounding said orifice 312, thereby defining a small clearance control gap with respect to the control element 380 which may be changeably positioned by a downward force applied to a control shaft 382, and through which control gap fluid may flow. It should be appreciated the illustration of FIG. 3 shows a normally open valve in an un-actuated open flowing fluid condition and therefore the control gap is at a maximum in the illustrated configuration.

Figure 4B:
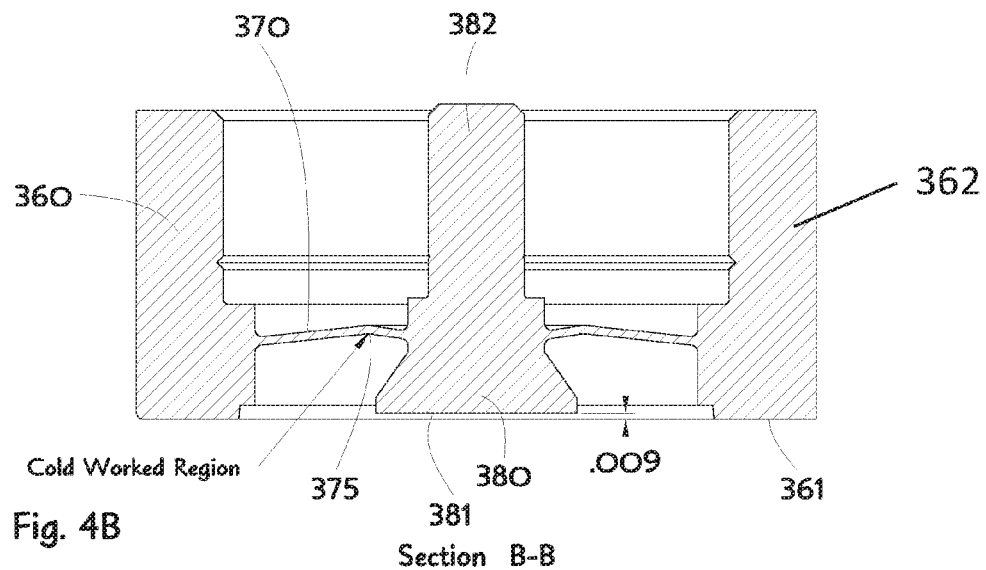
FIG. 4B is a cross-section through the diaphragm of FIG. 4A intended for a normally open valve.
Figure 4A:
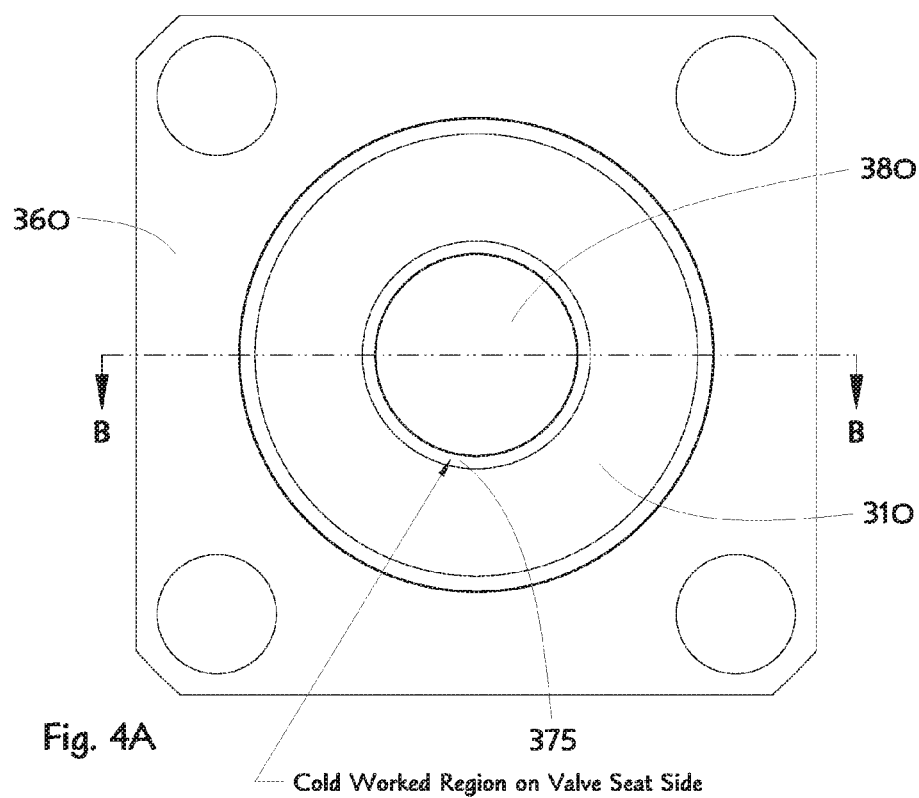
FIG. 4A is a plan view seen from the seat side of a diaphragm intended for a normally open valve.

FIG. 4A and FIG. 4B illustrate how cold working a region 375 on the valve chamber side of a diaphragm 370 will cause the diaphragm to become concave toward the valve chamber 350 while simultaneously being biased away the valve seat 320. This arrangement placing the cold worked region within the valve chamber is useful for a normally open valve design. FIG. 4A is a plan view of the valve housing 360 seen from the valve chamber side of the sealing diaphragm 370. FIG. 4B is a cross-section through the valve housing 360, after the cold working process, and shows how the resulting unbiased location of the control surface 381 of the control element 380 extends above the previously coplanar bottom 361 of the valve housing 360. Attaching the valve housing 360 to the valve body 390 will consequently position the control surface 381 of the control element 380 with a large gap above the valve seat 320. This unbiased gap is larger than intended for an un-actuated fully open flowing fluid condition. A suitable actuator assembly (not shown) may be coupled to the control shaft 382 applying a downward bias force in a manner which reduces the gap between the control surface 381 of the control element 380 and the seat 320 to a desired fully open gap distance. The diaphragm 370 will be consequently subject to continual elastic compression loading for all conditions of the normally open valve. Applying additional downward force to the control shaft 382 of the control element 380, partially closing the valve to reduce fluid flow, will further deflect the diaphragm 370 and increase the compression within the diaphragm material.

Cold working (or alternatively, work hardening or strain hardening) a concentric region of a diaphragm may be done by various processes. A valve housing with associated integral diaphragm formed in a valve housing body may be rotated in a lathe and a burnishing tool applied to the region. Alternatively, a roller burnishing tool may be powered by a machine spindle (e.g. a milling machine) impressed upon the desired region of the diaphragm. Or a form tool including a suitable ring-like protruding face may be pressed against the diaphragm to coin the desired cold worked region. It should be apparent to skilled designers that coining with a form tool may also be done to diaphragms that start as simple flat disks of sheet metal, which may later be attached to a valve housing body, for example, by welding, to form a valve housing.

Applicant has determined that cold working which creates a permanent plastic deformation reducing diaphragm thickness between 5% and 20% is useful. A typical width for a cold worked region is between 50% and 200% of the diaphragm thickness. After cold working, the formerly flat diaphragm bows into a pair of conical shapes which meet at the cold worked region forming a "W" shape as seen across a diameter—or a "V" shape when considering the shape across only a radius. The cold worked region is preferably radially positioned between ⅓ and ⅔ of the distance between the diaphragm inside diameter 72 and the diaphragm outside diameter 71 (illustrated in FIG. 1). The greatest unloaded deformation of the cold worked diaphragm results when the cold worked region is closest to the center of the diaphragm.

Figure 5:
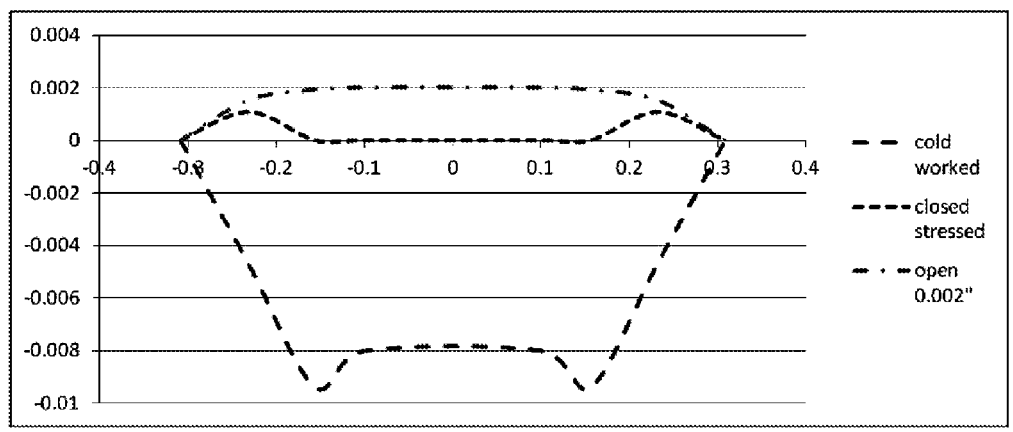
FIG. 5 is an exaggerated graphic depiction of the deformation in the diaphragm of a normally closed valve according to an embodiment of the present invention.

FIG. 5 provides an exaggerated scale plotted cross-section of a representative diaphragm after cold working a region for a normally closed valve. After the cold working process is performed the diaphragm 70 becomes distended and the flow controlling element 80 overly extended. Returning the flow controlling element 80 to its usual position results in a compressive load applied to the diaphragm portion between the cold worked region 75 and the diaphragm periphery. In the case of a normally closed valve (FIGS. 2A & 2B) this compressive load corresponds to a diaphragm derived spring force tending to close the valve. When a normally closed valve is moved to an open condition, the compressive load applied to the diaphragm is further increased. Designers will appreciate increased actuator force is required at the same time diaphragm compression is increased.

Figure 6:
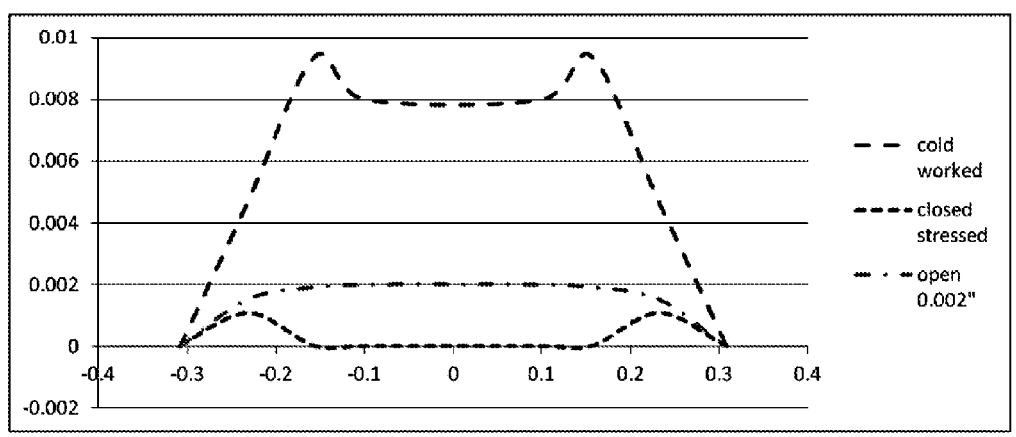
FIG. 6 is an exaggerated graphic depiction of the deformation in the diaphragm of a normally open valve according to another embodiment of the present invention.

FIG. 6 provides an exaggerated scale plotted cross-section of a representative diaphragm after cold working a region for a normally open valve. After the cold working process is performed the diaphragm 370 becomes distended and the flow control element 380 overly retracted. Returning the flow control element 380 to its usual position results in a compressive load applied to the diaphragm portion between the cold worked region 375 and the diaphragm periphery. In the case of a normally open valve (FIGS. 4A & 4B) this compressive load corresponds to a diaphragm derived spring force tending to open the valve. Note the maximum usual opening for the illustrated normally open valve will be less than offered by the distended diaphragm, therefore the diaphragm usual position is in fact partially closed when compared to the distended condition. When a normally open valve is moved to a closed condition, the compressive load applied to the diaphragm is further increased. Designers will appreciate increased actuator force is required at the same time diaphragm compression is increased. In a valve with a normally open diaphragm, the cold worked region is within the flow path of fluid moving from the inlet conduit, through the valve chamber, and to the outlet conduit. In a valve with a normally closed diaphragm, the cold worked region is outside of the flow path of fluid moving from the inlet conduit, through the valve chamber, and to the outlet conduit. In various embodiments, the diaphragm is formed from a corrosion resistant metallic alloy, such as type 316 stainless steel, a nickel-based superalloy, a cobalt-based superalloy, a nickel-chromium alloy, or a cobalt-chromium alloy, although other suitable materials may be used, depending on the type of fluid. In some embodiments, the diaphragm is formed from an alloy selected from Hastelloy® brand nickel-chromium alloys available from Haynes International, or is formed from an alloy selected from Elgiloy® brand cobalt-chromium alloys available from Elgiloy Specialty Metals. In some embodiments, the diaphragm can be formed from a polymeric material, such as a thermoplastic. In such embodiments, the diaphragm and associated valve housing can be formed by an injection molding process, whereby a localized stored stress is induced in the cold worked region by the injection mold design, in a manner similar to that used to form a living hinge.

In some embodiments, the diaphragm is formed as a shape that is other than circular. For example, in some embodiments, the diaphragm is formed as a non-circular, smoothly curved shape, such as an elliptical shape or an oval. In such embodiments, the cold worked region forms a closed loop (or a circuit), when viewed from above or below, that is uniformly spaced away from the outer periphery of the diaphragm. In non-circular embodiments, the diaphragm has an outer periphery and an inner periphery, rather than an outer diameter and an inner diameter. The outer periphery of the diaphragm is configured to be in sealing engagement with the valve housing.

In some embodiments, the valve housing 60, 360, the control element 80, 380, and the associated diaphragm 70, 370 are machined from a single piece of starting material corresponding to the valve housing body 62, 362. After machining, cold working is performed on the diaphragm 70, 370. Forming the control element, the associated diaphragm, and the valve housing from a single piece of starting material in this manner can help to achieve co-planarity among the control surface 81, 381 and the bottom of the valve housing 60, 360. After cold working, the control surface moves out of that plane when in a relaxed state and not yet installed onto the valve body 90, 390.

In other embodiments, the control element 80, 380 may be formed separately from the diaphragm 70, 370, and/or the valve housing body 62, 362. For example, referring to FIG. 1, the diaphragm 70, a portion 84 of the control element 80 that has the control surface 81, and the control shaft 82 might be initially made as separate pieces and then joined together by welding. The combined structure of diaphragm and control element may then be attached to a valve housing body 62, 362, for example, by welding, to form the valve housing 60, 360. In some embodiments, the portion 84 of the control element 80 could be threaded onto a stub projecting downwardly from control shaft 82 passing through a suitable hole in the center of diaphragm 70 with suitable means to prevent leakage out from (or into) valve chamber 50. In other embodiments, the control element 80 may be machined from one piece of material, the diaphragm 70 formed from another, and the control element 80 fitted through a suitable hole in the center of the diaphragm and welded to form a unitary structure and prevent leakage. The combined structure of diaphragm 70 and control element 80 may then be attached to a valve housing body to form the valve housing.

Similarly, in embodiments of a normally open valve, such as that depicted in FIG. 3, the valve housing 360, the control element 380, and the diaphragm 370 may be formed from a single piece of starting material, or may be formed from separate pieces of starting material that are assembled in the manner described above.

It should be appreciated that the flow through the control valve can be reversed, such that inlet conduits 10 and 310 operate as fluid outlet conduits and fluid outlet conduits 14 and 314 operate as fluid inlet conduits.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A valve housing for use with a valve seat, the valve housing comprising:
a valve housing body;
a valve diaphragm integral with the valve housing body, the valve diaphragm having a first surface and a second surface opposing the first surface, one of the first surface and the second surface having a plastically deformed concentric strain hardened region having a concave shape; and
a control element attached to the valve diaphragm, the control element having a control surface offset from the first surface of the valve diaphragm, the control surface being configured to selectively engage the valve seat;
wherein the plastically deformed concentric strain hardened region biases the control surface one of towards and away from the valve seat.

2. The valve housing of claim 1, wherein a thickness of the valve diaphragm is reduced between 5% and 20% in the strain hardened region of the valve diaphragm.

3. The valve housing of claim 1, wherein the strain hardened region has a radial width that is between 50% and 200% of a thickness of an adjacent region of the valve diaphragm.

4. The valve housing of claim 1, wherein the strain hardened region includes a concentric region of the valve diaphragm that is plastically deformed by a thickness reduction of about 10% of a thickness of an adjacent region of the valve diaphragm across a radial width of about 100% of the thickness of the adjacent region of the valve diaphragm.

5. The valve housing of claim 4, wherein the strain hardened region is between ⅓ and ⅔ of a distance between an inner periphery of the valve diaphragm and an outer periphery of the valve diaphragm.

6. The valve housing of claim 5, wherein the control element is attached to the valve diaphragm at the inner periphery of the valve diaphragm, the control element having a control shaft.

7. The valve housing of claim 1, wherein the valve diaphragm comprises a corrosion resistant metallic alloy.

8. The valve housing of claim 1, wherein the valve diaphragm and the valve housing body are machined from a single piece of material.

9. The valve housing of claim 6, wherein the control element, the valve diaphragm, and the valve housing body are machined from a single piece of material.

10. A control valve comprising:
a valve body having a fluid inlet conduit terminating at a fluid inlet orifice and a fluid outlet conduit commencing at a fluid outlet orifice;
a seat defined at one of the fluid inlet orifice and the fluid outlet orifice;
a valve housing body secured to the valve body;
a valve diaphragm integral with the valve housing body, the valve diaphragm having a first surface and a second surface opposing the first surface, one of the first surface and the second surface having a plastically deformed concentric strain hardened region having a concave shape; and
a control element attached to the valve diaphragm, the control element having a control surface offset from the first surface of the valve diaphragm, the control surface being configured to selectively engage the seat, the valve body, the valve housing body, and the valve diaphragm cooperating to define a valve chamber;
wherein the plastically deformed concentric strain hardened region biases the control surface of the control element one of toward and away from sealing engagement with the seat.

11. The control valve of claim 10, wherein the plastically deformed concentric strain hardened region includes a concentric region of the valve diaphragm that is plastically deformed by a thickness reduction of about 10% of a thickness of an adjacent region of the valve diaphragm across a radial width of about 100% of the thickness of the adjacent region of the valve diaphragm.

12. The control valve of claim 11, wherein the plastically deformed concentric strain hardened region is between ⅓ and ⅔ of a distance between an inner periphery of the valve diaphragm and an outer periphery of the valve diaphragm.

13. The control valve of claim 12, further comprising a control shaft extending away from the second surface of the valve diaphragm, wherein the control valve is a normally open control valve, and the plastically deformed concentric strain hardened region having the concave shape is formed in the first surface of the valve diaphragm.

14. The control valve of claim 12, further comprising a control shaft extending away from the second surface of the valve diaphragm, wherein the control valve is a normally closed control valve, and the plastically deformed concentric strain hardened region having the concave shape is formed in the second surface of the valve diaphragm.

15. The control valve of claim 10, wherein a thickness of the valve diaphragm is reduced between 5% and 20% in the plastically deformed concentric strain hardened region of the valve diaphragm, and the plastically deformed concentric strain hardened region has a radial width that is between 50% and 200% of a thickness of an adjacent region of the valve diaphragm.

* * * * *